(12) United States Patent
Visagie

(10) Patent No.: US 6,458,030 B2
(45) Date of Patent: Oct. 1, 2002

(54) GUIDING ELEMENTS IN A ROTARY THRESHING AND SEPARATION UNIT

(75) Inventor: Andrie Diederich Visagie, Bothaville (ZA)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/758,795

(22) Filed: Jan. 11, 2001

Related U.S. Application Data

(63) Continuation-in-part of application No. 09/125,348, filed on Aug. 18, 1998, now Pat. No. 6,176,778.

(30) Foreign Application Priority Data

Jul. 31, 2000 (WO) .............................. PCT/EP00/07374

(51) Int. Cl.[7] .......................... A01F 11/06; A23N 5/00; B02B 3/00
(52) U.S. Cl. .......................... 460/45; 460/46; 460/99; 460/143
(58) Field of Search .............................. 460/45, 16, 112, 460/73, 80, 69, 78, 111, 113, 119, 142, 67; 56/14.6

(56) References Cited

U.S. PATENT DOCUMENTS

| | | |
|---|---|---|
| 1,850,279 A | 3/1932 | Dieterich |
| 2,210,821 A | 8/1940 | Sharp |
| 2,222,282 A | 11/1940 | Court |
| 2,271,897 A | 2/1942 | Mast |
| 2,344,235 A | 3/1944 | Crumb et al. |
| 2,484,999 A | 10/1949 | Hyman |
| 3,348,780 A | 10/1967 | Barkstrom et al. |
| 3,401,727 A | 9/1968 | Blanshine et al. |
| 3,401,729 A | 9/1968 | Wallin et al. |
| 3,536,077 A | 10/1970 | Stott et al. |
| 3,844,293 A | 10/1974 | Young |
| 4,497,327 A | * 2/1985 | Hug et al. ..................... 460/67 |
| 4,739,773 A | * 4/1988 | West et al. ................... 460/16 |
| 5,017,177 A | 5/1991 | Mitkov et al. |
| 6,152,820 A | * 11/2000 | Heidjann et al. ........... 460/112 |

FOREIGN PATENT DOCUMENTS

| | | |
|---|---|---|
| WO | WO 97/29628 | 8/1997 |

* cited by examiner

*Primary Examiner*—Robert E. Pezzuto
*Assistant Examiner*—Árpád Fábián Kovács
(74) *Attorney, Agent, or Firm*—Husch & Eppenberger, LLC; Robert E. Muir; Richard J. Musgrave

(57) ABSTRACT

A rotary threshing and separation unit, comprising a rotor housing with a feeding zone, a separation zone and a discharge zone, parts of the circumferential housing being closed and other parts having openings, a rotary driven threshing and separation rotor arranged in the rotor housing, beater plates fixed on the threshing and separation rotor, and sucking air flow stream generating device sucking an air flow stream from the discharge zone through the rotor housing. Guiding elements arranged in the discharge zone, which are projecting over the inner surface of the rotor housing to an extent to which they allow chaff to be sucked out of the rotor housing but retain grain kernels inside. Helical vanes in at least the first half of the length of the rotor housing are projecting over the inner surface of the rotor housing and are at an angle or inclined towards the feeding direction of the harvested crop to support the feeding action. The incline angle of the helical vanes is adjustable which will regulate the feeding action inside of the rotor housing.

21 Claims, 7 Drawing Sheets

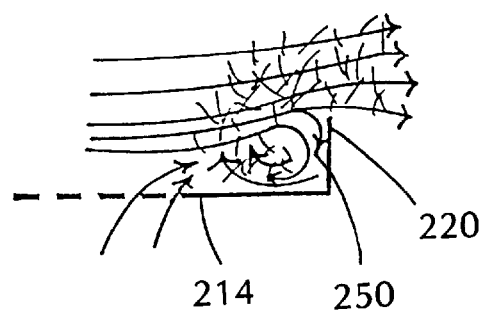
Fig. 4
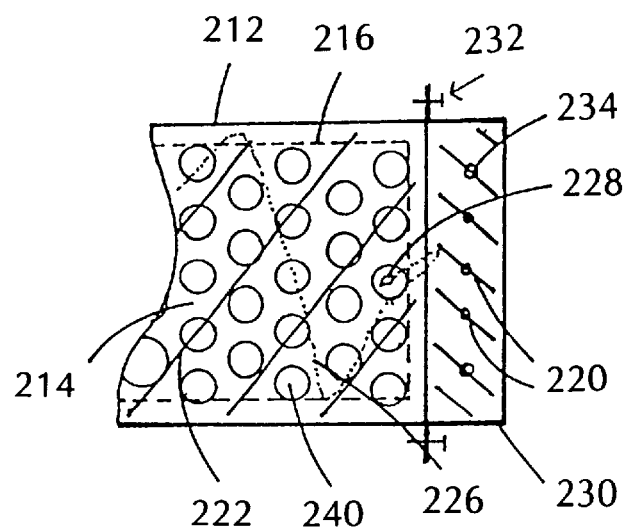
Fig. 5
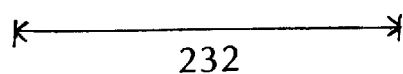
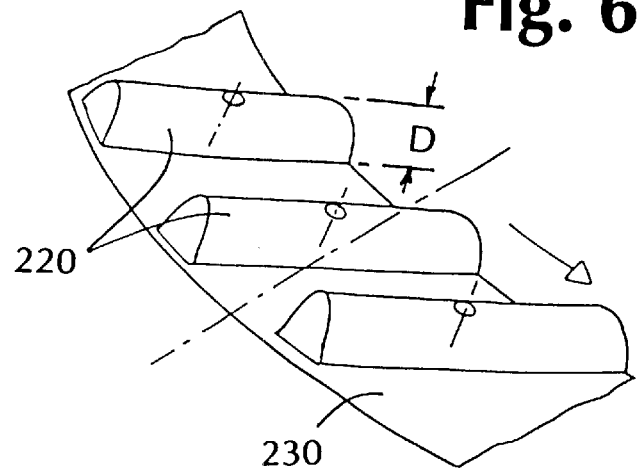
Fig. 6

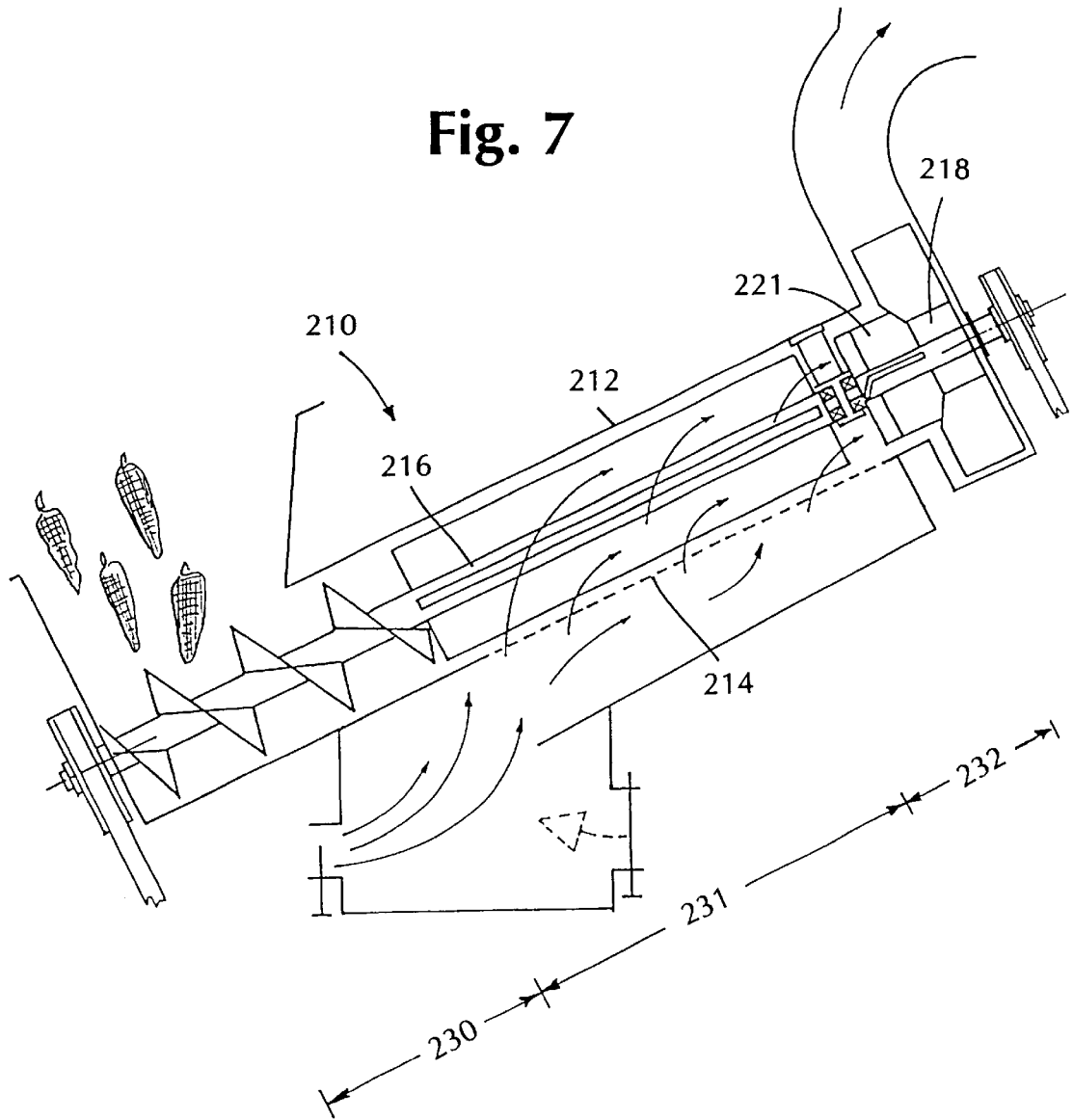

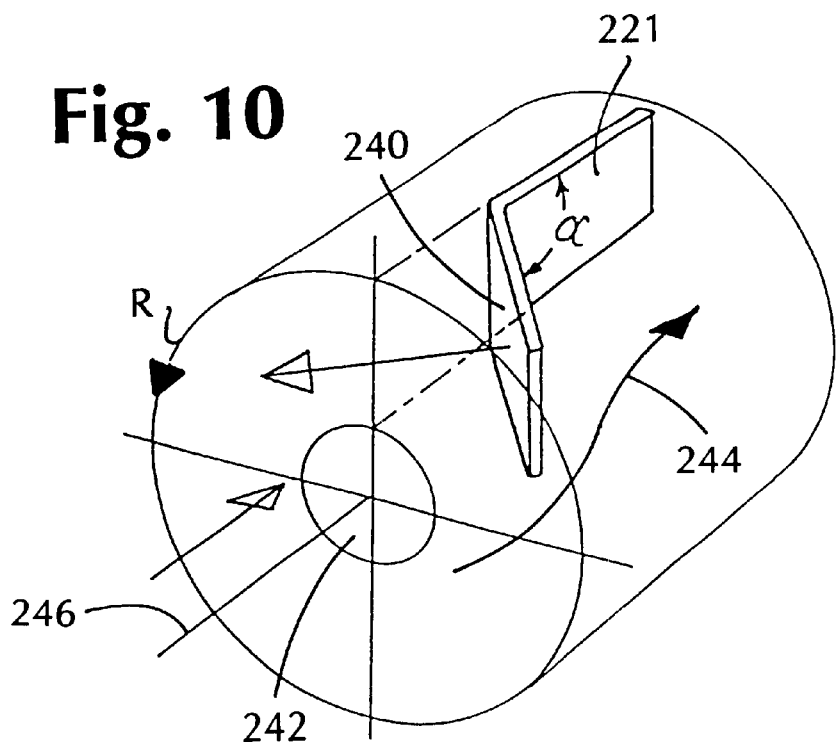
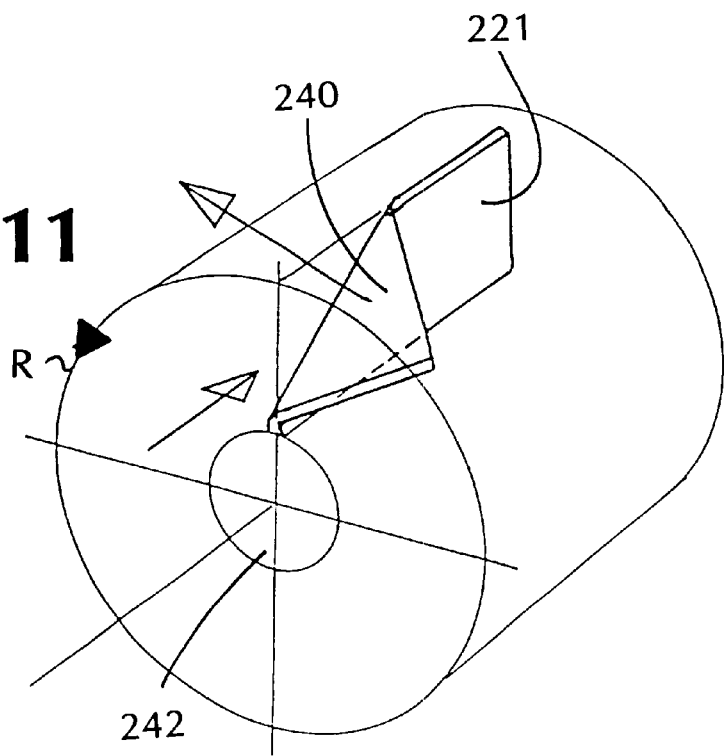

GUIDING ELEMENTS IN A ROTARY THRESHING AND SEPARATION UNIT

APPLICATION CROSS-REFERENCES

This application is a continuation-in-part of U.S. application Ser. No. 09/125,348, filed Aug. 18, 1998 and now U.S. Pat. No. 6,176,778 B1. This application also claims priority of PCT Application No. PCT/EP00/07374, filed Jul. 31, 2000, which named the United States as a designated country, and which claimed priority of South African patent application 96/1339, filed Feb. 20, 1996.

FIELD OF THE INVENTION

This invention relates to the threshing, separating and cleaning of harvested grain. It relates more specifically to a harvesting apparatus.

It is envisaged that the invention will find application in the field of threshing of grain like maize (corn), wheat, beans, and the like, more particularly in the field of harvesting grain having lightweight or small, or both lightweight and small grain kernels such as wheat.

For purposes of this specification, the term "threshing" (and derivatives thereof) should be interpreted as including threshing, separating and cleaning (and corresponding derivatives thereof).

BACKGROUND OF THE INVENTION

Combine harvesters use rotary threshing and separation units to harvest grain like maize, wheat, beans and the like (hereinafter "grain"). To thresh grain, it is required to separate the grain from the ears, pods and the like. After separating the grain from the ears, pods and the like, grain must be separated from the chaff, broken straw, debris and the like (hereinafter "chaff"). A fan or blower is used for this purpose whereby the fan produces an air flow stream that carries off or separates chaff from the grain. The chaff is carried off or separated from the grain because the chaff is lighter in weight than the grain. However under difficult harvesting conditions, such as in humid weather, the air flow stream may not be of sufficient velocity to move or carry the chaff. To compensate for difficult harvesting conditions and to improve performance of the rotary threshing and separation unit under these conditions, the speed of the fan or blower is increased. However when the fan or blower speed is increased, the air flow may become excessive resulting in grain kernels being discharged along with the chaff from the rotor housing which is unacceptable.

The present invention is directed to overcoming one or more of the problems set forth above.

SUMMARY OF THE INVENTION

An aspect of the invention is to improve feeding performance of a rotary threshing and separation unit having a fan or blower without an increase in grain loss.

In one aspect of this invention there are provided guiding elements arranged between the separation zone and discharge zone that do not interfere with the discharge of chaff but which precludes grain kernels from exiting the rotary threshing and separation unit.

In another aspect of the invention there are provided guiding elements that reduce the amount of grain kernel loss because of a high velocity air flow stream.

In still another aspect of the invention there are provided guiding elements and sieve means arranged in close proximity to the guiding elements and wherein the guiding elements are at an angle or inclined towards the feeding direction of the harvested crop to deflect grain kernels at high speeds back into the rotor housing so that the grain kernels deflected back can exit the rotor housing through the openings in the sieve means.

In still another aspect of the invention there are provided guiding elements that are at an angle and inclined towards the feeding direction of the harvested crop and these angles of inclinement are adjustable so that they can be adjusted to the particular working condition, such as grain type or humidity of the harvested crop.

In still another aspect of the invention there are provided helical vanes projecting over the inner surface of the rotor housing and in at least the first half of the length of the rotor housing and wherein the helical vanes are inclined towards the feeding direction of the harvested crop for improved feeding action whereby the harvested crop is accelerated faster and obtains rotational movement earlier.

In still another aspect of the invention there are provided helical vanes having an adjustable angle of inclinement so that the feeding action inside of the rotor housing can be regulated.

The above aspects are merely illustrative and should not be construed as all-inclusive.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 4 is a schematic illustration of the air flow stream at the guiding elements;

FIG. 5 is a top view of the discharging zone of a rotor housing;

FIG. 6 is a cut-out view at approximately the discharge zone illustrating the guiding elements;

FIG. 7 is a side elevation of a second embodiment of the rotary threshing and separation unit;

FIG. 10 illustrates a second embodiment of the guiding elements; and

FIG. 11 illustrates a third embodiment of the guiding elements.

DETAILED DESCRIPTION

Figure 1:
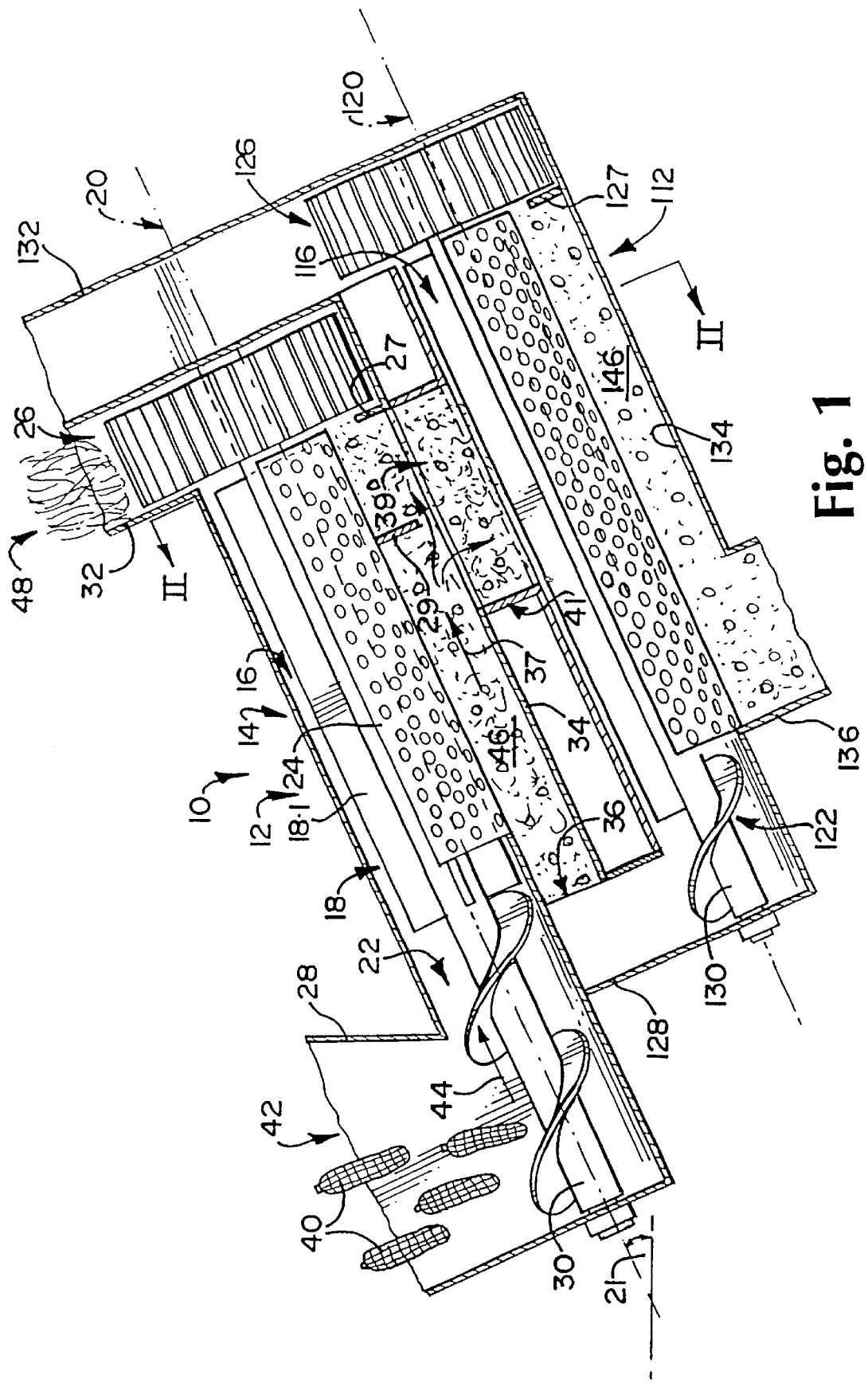
FIG. 1 is an axial sectional view illustrating the rotary threshing and separation unit.

With reference to FIG. 1, a rotary threshing and separation unit is generally indicated by reference numeral 10. The rotary threshing and separation unit 10 is a composite threshing apparatus having a first apparatus in the form of threshing apparatus generally indicated by reference numeral 12 and a second apparatus in the form of a cleaning apparatus generally indicated by reference numeral 112. The first 12 and second apparatus 112 are arranged to perform successive steps in the method of the invention i.e. they operate in series. The second apparatus 112 is arranged generally below the first apparatus 12.

The first threshing apparatus 12 comprises a generally round cylindrical casing generally indicated by reference numeral 14 and defining a threshing zone generally indicated by reference numeral 16 about a threshing axis 20. The threshing axis 20 is arranged, in this embodiment, at an angle 21, which is between about 30° and about 45° from the horizontal.

The first threshing apparatus 12 comprises threshing means 18 operatively provided within the threshing zone 16.

Transport means 22, which is in the form of a screw conveyor or auger is arranged to transport harvested crop in the forms of ears, pods, or the like from a hopper 28 obliquely upwardly into the threshing zone 16. The screw conveyor 22 is conveniently co-axial with the axis 20.

A longitudinal boundary along a lower portion of the threshing zone 16 is defined by means of an arcuate, trough-like sieve 24 having perforations. The sieve 24 is arranged concentrically with the axis 20.

At one end, which is an upper end in use, of the threshing zone 16, there is provided a fan 26, co-axially with the threshing axis 20, to generate an air flow stream from the hopper 28, through the threshing zone, and to exhaust it via outlet conduit 32. The fan 26 is of the centrifugal type and its inlet is thus on axis.

A common shaft or axle 30 acts as a tubular shaft over which flighting of the auger 22 is provided, and in series with the flighting, beater bars 18.1 of the threshing means are mounted on the shaft 30 to extend radially and longitudinally. Also the fan 26 is mounted on the shaft 30. In another embodiment, the fan 26 may be driven from the shaft 30 via a speed changing device.

Underneath the sieve 24, and generally parallel with the axis 20, there is provided a trough 34 which is, at its lower end, open as indicated at 36. The open end 36, in relation to the second apparatus 112, corresponds to or is analogous to the hopper 28 in relation to the first apparatus 12, and leads into transport means of the second cleaning apparatus 112.

Figure 2:
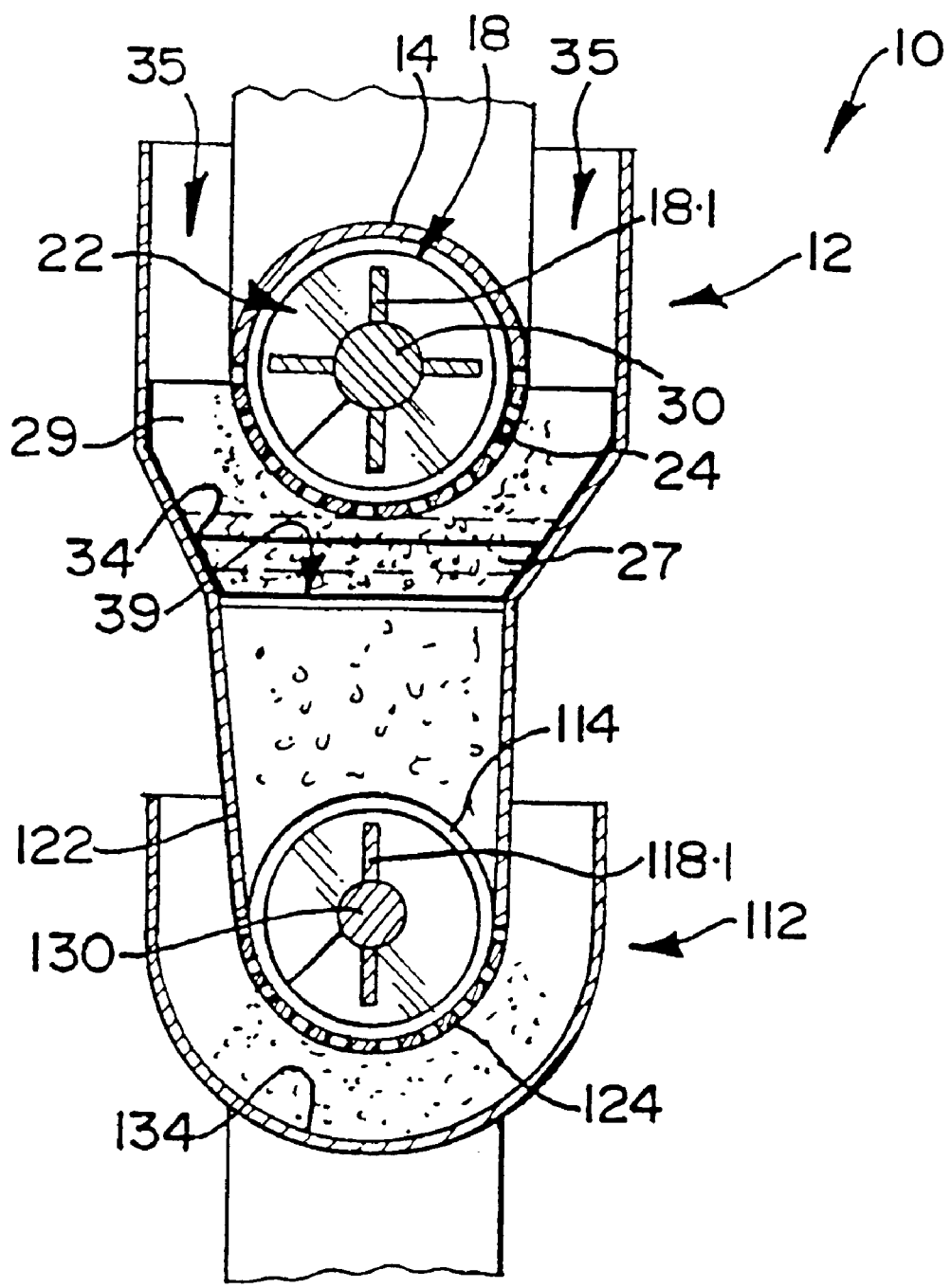
FIG. 2 is a sectional view taken at II—II in FIG. 1.

Air inlet openings 35, which are out of the plane of the section of FIG. 1 and which can be perceived from FIG. 2, allow air to be drawn via the trough 34 as shown at 37 into the fan 26. The inlet opening of the fan 26 is sufficiently large to have an influence outside the threshing zone 16. Air also flows via the opening between the trough 34 and the sieve 24 and via the openings in the sieve 24 to the central regions of the fan inlet. Such air flow lifts chaff off the sieve 24 and carries the chaff to the fan 26.

A volute for the fan 26 is formed partially by a transverse baffle 27 at an upper end of the trough 34. The baffle 27 is mounted on the trough and extends upwardly from the trough. The baffle 27 is easily replaceable, e.g. to adjust its height. The baffle 27 provides a barrier to prevent grain, which because of its relatively high density, is concentrated along the floor of the trough, from being drawn into the fan 26 and exhausted via conduit 32.

By way of development, a transverse intermediate baffle 29 is provided between the open end 36 and the baffle 27. The baffle 29 depends from the sieve 24. It can readily be replaced to vary, for example, its height. The free ends of the baffles 27 and 29 preferably overlap when seen in axial projection. The upstream baffle 27 will deflect grain, which has become airborne to prevent such airborne grain from being drawn into the fan 26. Furthermore, the baffles 27, 29 cause the auxiliary air flow stream to become circuitous to be directed momentarily generally into an auxiliary grain exit 39 which will be described hereinafter. The baffle 29 is advantageously opposite to a center of the auxiliary grain exit 39.

It is to be appreciated that, because the sieve 24 and the trough 34 are merely arcuate or convex and not circular, the air flow stream 37 moves in a relatively narrow channel, thus making it more effective, alternatively requiring less air to be moved.

In use, harvested crops in the form of ears, pods, or the like fall under gravity into the hopper 28 to be transported obliquely upwardly as indicated at 44 into the threshing zone 16 by the transport means 22. In the threshing zone 16, the ears, pods or the like are threshed to liberate grain from chaff. The chaff in the threshing zone 16 is carried by the flow stream through the fan 26 to be exhausted via the conduit 32 as indicated at 48. The grain falls under gravity and under centrifugal force through the air flow stream onto the sieve 24. The apertures of the sieve are selected to pass liberated grain with clearance. Thus, liberated grain, with an amount of relatively small pieces of chaff, fall into the trough 34 as indicated by reference numeral 46. The small pieces of chaff are carried by the flow stream 37 along the trough 34.

In accordance with this embodiment, there is provided an aperture forming an auxiliary grain exit 39 (mentioned above) in the bottom of the trough 34 between the fan 26 and the open end 36. The baffle 27 may be at or proximate downstream extremity of the auxiliary grain exit 39. The auxiliary grain exit 39 leads via an internal chamber 41 to the second apparatus 112.

Thus, grain which may be carried in the air flow stream 37, because of the relatively heavy weight compared to the weight of the small pieces of chaff, will tend to be at a low level, i.e. concentrated near the bottom of the trough 34. A portion of the air flow stream carrying such concentrated grain flows via the auxiliary grain exit 39 and the chamber 41 (which will be relatively stagnant in respect of airflow) into the apparatus 112. The baffle 27 precludes grain from being carried by the air flow stream through the fan 26 to be exhausted via the conduit 32 while allowing the small pieces of chaff to exit via the fan 26 and the conduit 32.

The length of the grain exit may be between 25% and 75%, typically about 50% of the length of the trough 34, which is approximate in length to the sieve 24. The projected width of the grain exit may be about equal to the to the projected width of the sieve. The height of the chamber 41 may be about equal to the spacing between the sieve and the trough.

As mentioned above, interaction of the baffles 27, 29 and the auxiliary air flow stream causes the flow stream to become circuitous around the end of the baffle 29. Grain, carried in the auxiliary air flow stream and which will tend to progress tangentially on account of inertia as a result of relatively high density, will be directed generally into the auxiliary grain exit 39. In contrast, chaff, being of relatively low density, will tend to follow the auxiliary air flow stream to be exhausted.

The major portion of the liberated grain 46 slides along the trough 34 via the open end 36, which forms a main grain exit in the context of this embodiment, onto the transport means 122 of the second, cleaning apparatus 112.

The Applicant is of opinion that approximately 25% of the liberated grain exit the first apparatus 12 via the auxiliary grain exit 39, and the balance of about 75% via the main grain exit 36. This ratio is influenced by and can be adjusted by adjusting the velocity or speed of the airflow stream.

Furthermore, the heights of the baffles 27, 29 and thus their overlap, can be adjusted by replacing one or both of them with baffles having different lengths.

The second, cleaning apparatus 112 is similar to the first, threshing apparatus 12 and is not again described. Like reference numerals refer to like components or features. Reference numeral 118.1 indicates stirring bars or agitating bars in place of the beater bars 18.1.

Grain exiting the apertures via the main grain exit 36, is transported into the cleaning zone 116 by transport means 122. The grain exiting via the auxiliary grain exit 39 falls directly into the cleaning zone 116.

Cleaned grain 146 is discharged from the threshing apparatus 10 via an outlet 136 where it is collected. Chaff is exhausted via the conduit 32 and 132.

If desired, a re-circulating grain exit may be provided in the trough 134 analogous to and in a position corresponding to the auxiliary grain exit. Products exiting such re-circulating grain exit can then be re-circulated or returned, either via the hopper 28, or via the transport means 122.

The Applicant believes that, in many applications, threshing by means of the first threshing apparatus 12 will provide adequately cleaned grain and that a second step, which will merely be a cleaning step, will not be required. Thus, in those applications, grain will be collected from the open end 36, and the products from the auxiliary grain exit 39 will be returned to or re-circulated to the hopper 28.

It is a first advantage that grain and chaff are separated already in the threshing zone 16. This is conducive to simplicity of design and effectiveness in operation. Transport of the liberated grain and chaff is facilitated and the threshing apparatus can be provided less expensively than comparable threshing apparatus of which the Applicant is aware.

It is further an advantage that the sieve 24 is stationary as it is operated by means of gravity and centrifugal forces, operating on the liberated grain.

It is a further advantage that the sieve 24 through which the liberated grain is passed is merely arcuate and not fully cylindrical. Provision of an arcuate or, in this case, semi-cylindrical sieve is adequate and allows a saving in cost.

The provision of the auxiliary grain exit 39 allows the intensity of the air flow stream to be greatly increased without aggravating loss of grain through the conduit 32. This enhances the cleaning action. This is especially advantageous with small or light grain such as wheat. The Applicant is of opinion that the provision of such an auxiliary grain exit 39, especially in association with the baffle downstream thereof and also the opposing baffle, allows the capacity of the apparatus to be increased substantially. With light and/or small grain kernels, the capacity can be increased by 100% or more in some applications. The Applicant believes that such an improvement can be achieved because of the enhanced cleaning action because of the increased air flow stream intensity.

Figure 3:
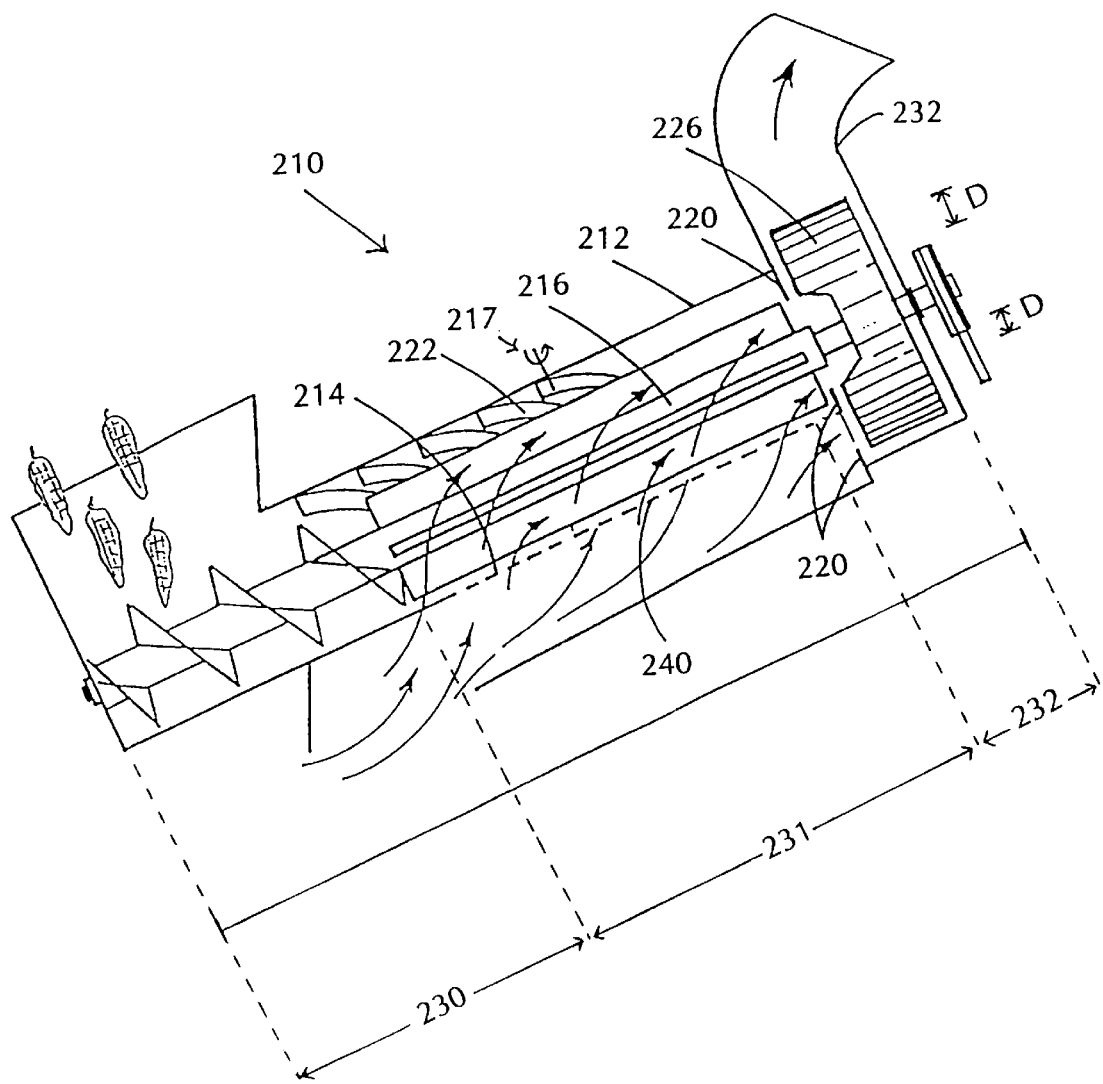
FIG. 3 is a side elevation of a first embodiment of the rotary threshing and separation unit.

Referring now to FIG. 3, there is shown a rotary threshing and separation unit 210 having a rotor housing 212, where the rotor housing 212 has circumferential having openings 240 located therein. The rotary threshing and separation unit 210 has a feeding zone 230, a separation zone 231, a discharge zone 232, sieve 214 arranged at least in the separation zone 231, a rotary driven separation rotor 216 arranged in the rotor housing 212, and a blower or fan 26 to generate an air flow stream from the feeding zone 230 through the rotor housing 212 to exhaust via outlet conduit 32. Located between the fan 26 and separation zone 231 are guiding elements 220 projecting over the inner surface of the rotor housing 212. The guiding elements 220 are adjustable and can be adjusted depending on the working conditions. The guiding elements 220 form a barrier between the separation zone 231 and discharge zone 232 and this barrier is adjustable and can increase or decrease in length. The guiding elements 220 are projecting over the inner surface of the rotor housing 212 by distance D. Of course, the distances D shown in the drawing are selected as an example. Depending on the working conditions, distance D can be adjusted. However, under all conditions a maximum projection of 3 cm for Distance D over the inner surface of the rotor housing is sufficient. The guiding elements 220 may preferably include projections which are stamped into the inner surface of the discharge zone 232, but they may also be welded, screwed, fixed with clips, riveted or pressure fitted, as shown in FIG. 6. The guiding elements 220 should have a smooth and rounded surface to avoid grain kernel breakage. When the harvested crop is moving axially through rotor housing 212, most of the threshed grain is separated and exits the rotor housing 212 through openings 240 in the sieve 214. The movement of the lighter fractions of the harvested good in the discharging zone 232 is dependent from the direction of the air flow stream. The principle of the air flow stream at the point of contact, with the guiding elements 220, is illustrated in FIG. 4. In the discharge zone 232, the harvested crop consisting of the fractions straw, grain kernels and chaff reaches its highest rotational speed. As the air flow stream reaches its highest speed, it has the effect of moving the heavier fractions of the harvested good along the inner surface of the rotor housing 212 with high centrifugal energy. Thus, when the air flow stream hits the guiding element 220, the air flow stream is deviated into a bending or circular motion 250. The bending movement 250 of the air flow may join the air flow stream entering the rotor housing 212 through the openings 240 of the sieve 214. The bending movement 250 of the air flow stream is not strong enough to lift or move the rotating grain kernels over the guiding elements 220. On the other hand, the bending movement 250 of the air flow stream causes an air turbulence around the guiding elements 220 which is of sufficient velocity to carry or lift lighter fractions of harvested crop like straw or chaff over the guiding elements 220 and expels same through the outlet conduit 32. Accordingly, the guiding elements 220 separate grain kernels from other fractions. The guiding elements 220 allow straw and chaff to exit the rotor housing 212 through the outlet conduit 32 while precluding the grain kernels from exiting the rotor housing 212. Because the grain kernels have a higher specific weight than chaff, the grain kernels move directly over the inner surface of the rotor housing 212.

According to another preferred embodiment, the guiding elements 220 are at an angle with respect to the horizontal and inclined towards the feeding direction of the harvested crop to deflect grain kernels back towards the feeding direction of the harvested crop. If the grain kernels contact the guiding elements 220 at high speed in an axial movement, the grain kernel is not retained but deflected into the rotor housing 212. Because the sieve 214 is arranged in proximity towards the guiding elements 220, the grain kernels exit the rotor housing 212 through the openings 240 in the sieve 214.

The incline angle of the guiding elements 220 is adjustable and can be adapted to the specific working conditions, like type of grain or humidity of the harvested crop. Specifically, the height of the guiding elements 220 is adjustable.

If the axis of the rotor housing 212 is inclined by at least 20°, the separation of the grain kernels is improved because the gravitational forces assist the guiding elements 220 in deflecting the grain kernel back into the rotor housing 212. Furthermore, the blower or fan 26 causes an air flow stream to travel through the openings 240 in the sieve 214 into the rotor housing 212 producing a stronger air flow stream.

However, under heavy workloads or difficult harvesting conditions, there may be some grain kernels in the harvested crop when it reaches the discharging zone 232. The feeding action inside of the rotor housing 212 can be improved, if there are helical vanes 222 attached to the inner surface of the rotor housing 212 as shown in FIGS. 3 and 5. They are inclined towards the feeding direction to facilitate the axial movement towards the discharging zone 232. Number, shape and location of the helical vanes 222 are selected according to the workload and harvesting conditions. The helical vanes 222 are adjustable by an adjustment element 217 in relation to the feeding direction. By this, there is achieved a system which is capable of accelerating the harvested crop into a high helical movement alongside the inner surface of a rotor housing, while kicking back those fractions in the bulk of harvested good which are heavier and thereby sorting out grain kernels preventing grain losses.

Referring now to FIG. 5, illustrated is a partial view of the discharging zone 232 of a rotor housing 212. The threshing and separation rotor 216 is shown as broken lines. Under the top cover of the rotor housing 212, there is the plurality of helical vanes 222. Underneath the threshing and separation rotor 216, there is the sieve 214 having openings 224. The grain kernels reach their highest speed when they reach the discharging zone 232. A possible moving path 226 of a grain kernel 228 is shown in dotted lines. When the grain kernel 228 hits the guiding element 220 in the discharging zone 232, it is at a very high velocity, and due to its axial movement it hits the guiding element 220 at a relative angle. According to the rule that the angle of incidence is equal to the angle of reflection, a grain kernel, which hits guiding elements 220, deflects back into the separation zone 231 or into the openings 224 of the sieve means 214 in the discharge zone 232. The deflected grain kernel 228 will reduce in speed; however, the speed of the grain kernel 228 will increase by the subsequent rotating mass of harvested crop and by the beater plates, and it can exit the rotor housing 212 through the opening 224 in the sieve means 214. As can be seen from FIG. 5, the guiding elements 220 may be arranged in various ways depending on the situation. There are shown a plurality of guiding elements 220 fixed on a ring 230 attached by screws 232 on the rotor housing 212, so that it can be exchanged, if necessary. As indicated by circle 234, the angle or inclination of the guiding elements 220 may also be adjustable. The guiding elements 220 can also directly be fixed on the sieve 214 to fully or partially deflect grain kernels 228 around the inner circumference of rotor housing 212.

According to another improvement, there are helical vanes 222 in at least the first half of the length of the rotor housing 212. The helical vanes 222 are projecting over the inner surface of the rotor housing 212 and are at an angle or inclined towards the feeding direction of the harvested crop to support the feeding action. This results in an improved feeding action in the first half of the length of the rotor housing 212 resulting in the harvested crop accelerating faster and rotating earlier. The incline angle of the helical vanes 222 is adjustable. Adjusting the angle of the helical vanes 222 will regulate the feeding action inside of the rotor housing 212.

In FIG. 7, rotatably driven guiding elements 221 are substituted for the stationary guiding elements 220. The rotatably driven guiding elements 221 are covering substantially all of the cross-section of the discharge zone 232 of the rotor housing 212 during rotational movement.

Figure 8:
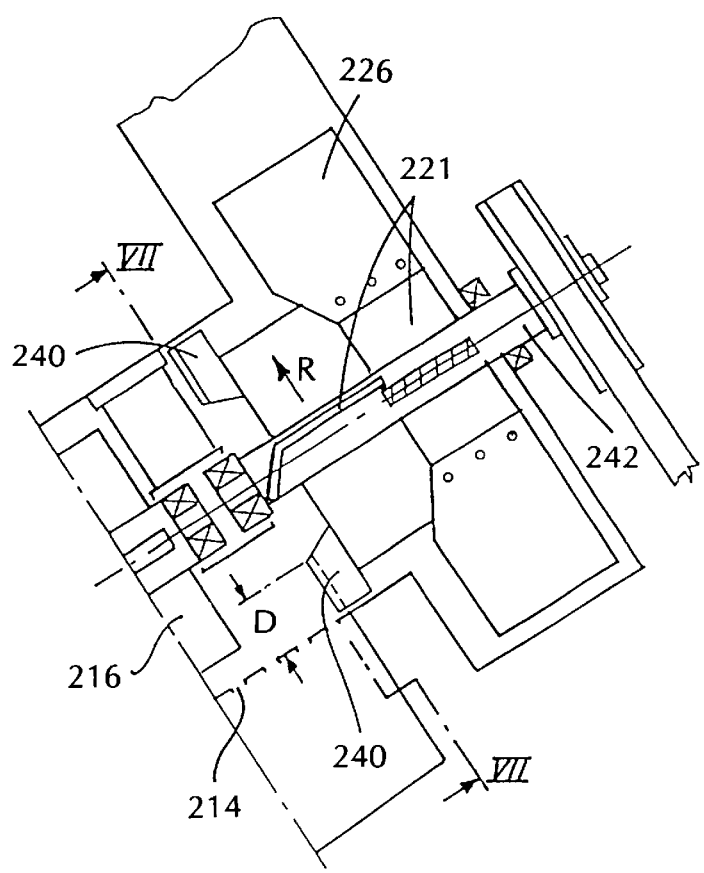
FIG. 8 is an enlarged view of the discharge zone of the rotary threshing and separation unit shown in FIG. 7.

In FIG. 8, the guiding elements 221 are illustrated fixed to shaft 242 of the blower or fan 226. The fan 226 generates the air flow stream. The guiding elements 221 comprise an inclined deflection surface 240. It is important that the inclined deflection surface 240 is at least effective in the outer cross-sectional zone of the discharge end 232 of the rotor housing 212. This is so because most of the grain kernels are accumulated at the lower portion of the rotor housing 212 because of the gravitational forces acting upon them. In FIG. 8, the deflection surface 240 has an effective height of D', however, this may be adapted to the particular application. The blower or fan 226 has a shaft 242 that rotates in the direction indicated by arrow R. The air flow stream that is leaving the discharge zone 232 of rotor housing 212 is moving rectangular in relation to the rotational direction of shaft 242 and is sucked towards the blades of blower 212. In relation to this, the deflection surfaces 240 of guiding elements 221 are inclined in a way that it kicks back heavy fractions of the mat of harvested material into the rotor housing 212, while slightly deviating the travel path of the lighter fractions and allowing same to move along the deflection surface and continue towards the fan or blower 226.

Figure 9:
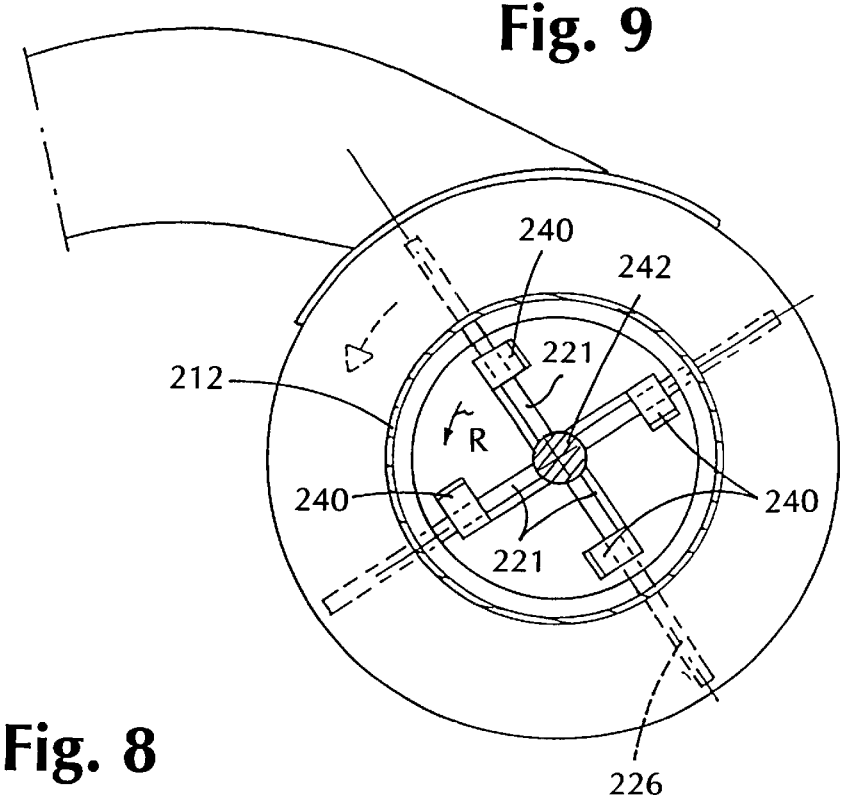
FIG. 9 a cross-sectional view taken at VI—VI of FIG. 8.

In FIG. 9 it can be seen that during rotational movement, the guiding elements 221 cover a bigger portion of the cross section of the rotor housing 212, however, there is still enough space between the single guiding elements 221 to allow straw and chaff to pass to the fan or blower 226.

In FIG. 10 the flow path of the grain kernels and general air flow stream is illustrated. The air flow stream is indicated by arrow 244 demonstrating how the air flow stream is deviated by the guiding elements 221. The grain kernels moving from the rotor housing 212 are deflected by a deflection surface 240. The deflection surface 240 is at an angle α. The angle α will determine the direction that the grain kernel is kicked back into the rotor housing 212 along the line 246. The grain kernels that are deflected may exit the rotor housing 212 through the openings in sieve 214.

FIG. 11 illustrates an alternative deflection surface 240. By bending the deflection surface 240 along a line, which is not rectangular towards the rotational axis of shaft 242, a triangular geometry of the deflection surface 240, can be achieved.

While the preferred structure in which the principles of the present invention have been incorporated is shown and described above, it is to be understood that the invention is not to be limited to the particular details thus presented, but in fact, widely different means may be employed in the practice of the broader aspects of this invention. The scope of the appended claims is intended to encompass all obvious changes in the details, materials and arrangements of parts, which will occur to one skilled in the art upon a reading of the disclosure.

What is claimed is:

1. A rotary threshing and separation unit having a rotary housing that is circumferential having apertures thereon, comprising:

means for receiving harvested crop and defining a feeding zone;

a rotary driven threshing and separation rotor arranged in the rotor housing and therewith defining a separation zone;

a transport mechanism for transporting the harvested crop from the feeding zone to the separation zone;

a plurality of beater plates fixed to the threshing and separation rotor to thresh the harvested crop;

means operatively connected to the separation zone for exhausting chaff and defining a discharge zone;

a fan for generating an air flow stream from the feeding zone to the discharge zone for separating chaff from grain kernels and discharging the chaff from the rotary threshing and separation unit after threshing;

guiding elements located between the feeding zone and discharge zone and projecting over the inner surface of the rotor housing;

means for movably mounting the guiding elements;

wherein the means for movably mounting the guiding elements are constructed and arranged so that the guiding elements are removably mounted to and from a first position; and means for adjusting the guiding elements to preclude grain kernel from exiting and to facilitate discharge of straw and chaff from the rotary threshing and separation unit.

2. A rotary threshing and separation unit according to claim 1, further including:

helical vanes connected to at least a first half of the length of the rotor housing, wherein the helical vanes are projecting over the inner surface of the rotor housing at an angle.

3. A rotary threshing and separation unit according to claim 2, wherein the angle of the helical vanes are adjustable.

4. A rotary threshing and separation unit according to claim 1, wherein the guiding elements are at an angle to deflect grain kernels against a feeding direction of the harvested crop thereby precluding the grain kernels from being transported to the discharge zone and discharged from the rotary threshing and separation unit.

5. A rotary threshing and separation unit according to claim 4, wherein the angle of the guiding elements are adjustable.

6. A rotary threshing and separation unit according to claim 5, further including an axis of the rotor housing, wherein the axis of the rotor housing is at an angle of at least 20° relative to horizontal.

7. A rotary threshing and separation unit according to claim 3, further including an axis of the rotor housing, wherein the axis of the rotor housing is at an angle of at least 20° relative to horizontal.

8. A rotary threshing and separation unit according to claim 1, further including:

a sieve having openings and adjacent to a lower portion of the separation zone, wherein the sieve has a trough-like shape and a sieve axis and being arranged longitudinally adjacent to the longitudinal separating zone.

9. A rotary threshing and separation unit according to claim 8, wherein the air flow stream from the fan produces an air volume through openings in the sieve into the separation zone of the rotor housing.

10. A rotary threshing and separation unit according to claim 5, wherein the guiding elements are exchangeable.

11. A rotary threshing and separation unit according to claim 1, wherein the guiding elements are adjustable in height.

12. A rotary threshing and separation unit according to claim 1, wherein the guiding elements are moveable from a first position to a second position.

13. A rotary threshing and separation unit according to claim 12, wherein the guiding elements are moveable from the second position to the first position.

14. A rotary threshing and separation unit according to claim 1, further including:

helical vanes connected to at least a first half of the length of the rotor housing, wherein the helical vanes are projecting over the inner surface of the rotor housing inclinded towards the feeding direction of the harvested crop being threshed.

15. A rotary threshing and separation unit according to claim 1, wherein the guiding elements are inclinded towards a feeding direction of the harvested crop being threshed to deflect grain kernels against a feeding direction of the harvested crop thereby precluding the grain kernels from being transported to the discharge zone and discharged from the rotary threshing and separation unit.

16. A rotary threshing and separation unit having a rotary housing that is circumferential having apertures thereon, comprising:

means for receiving harvested crop and defining a feeding zone;

a rotary driven threshing and separation rotor arranged in the rotor housing and therewith defining a separation zone;

a plurality of beater plates fixed to the threshing and separation rotor to thresh the harvested crop;

means operatively connected to the separation zone for exhausting chaff and defining a discharge zone;

a fan for generating an air flow stream from the feeding zone to the discharge zone for separating chaff from grain kernels and discharging the chaff from the rotary threshing and separation unit after threshing; and rotatably driven guiding elements having a deflection surface inclined toward the air flow stream and located between the feeding zone and discharge zone, wherein the guiding elements are adjustable and project over the inner surface of the rotor housing, and the guiding elements are arranged to preclude grain kernels from exiting and to facilitate discharge of chaff from the rotary threshing and separation unit.

17. A rotary threshing and separation unit according to claim 16, further including a shaft used to rotate the fan, wherein the rotatably driven guiding elements are attached to the shaft.

18. A rotary threshing and separation unit according to claim 16, wherein the rotatably driven guiding elements are located in at least in the outer cross-section area of the discharge zone of the rotor housing.

19. A rotary threshing and separation unit according to claim 16, wherein the rotatably driven guiding elements are moveable from a first position to a second position.

20. A rotary threshing and separation unit according to claim 19, wherein the rotatably driven guiding elements are moveable from the second position to the first position.

21. A rotary threshing and separation unit according to claim 16, wherein the guiding elements are adjustable in height.

* * * * *